Oct. 13, 1931.  C. H. CUNO ET AL  1,827,192
LIQUID LEVEL GAUGE
Filed Oct. 1, 1927   2 Sheets-Sheet 2
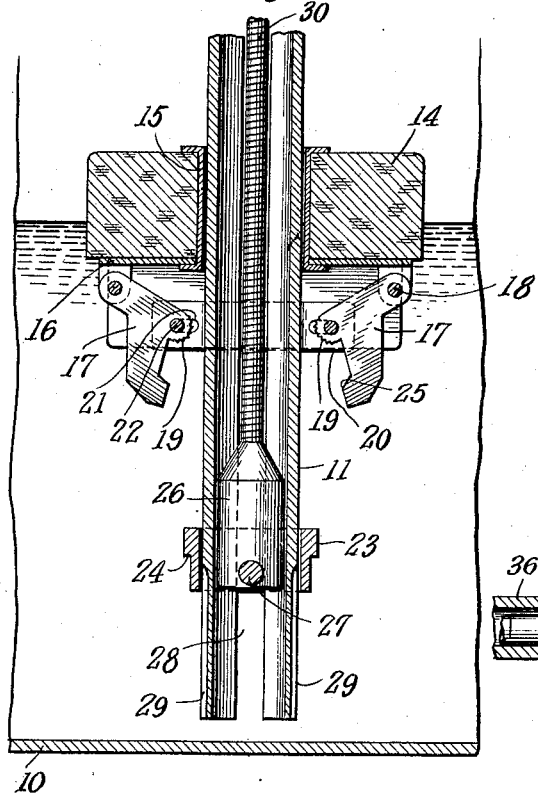
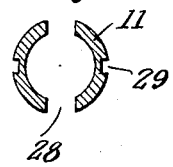
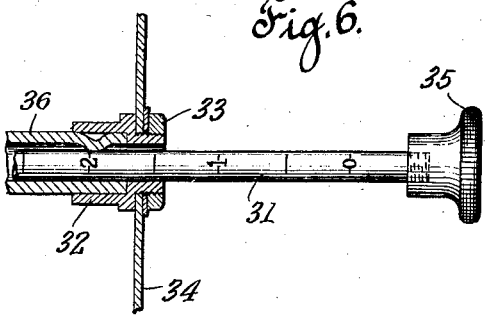
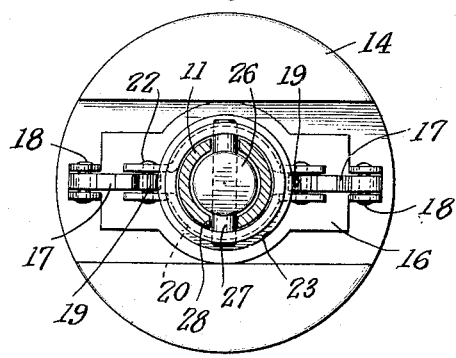
INVENTORS
C. H. Cuno
S. C. Wolfson
BY
ATTORNEY Patented Oct. 13, 1931

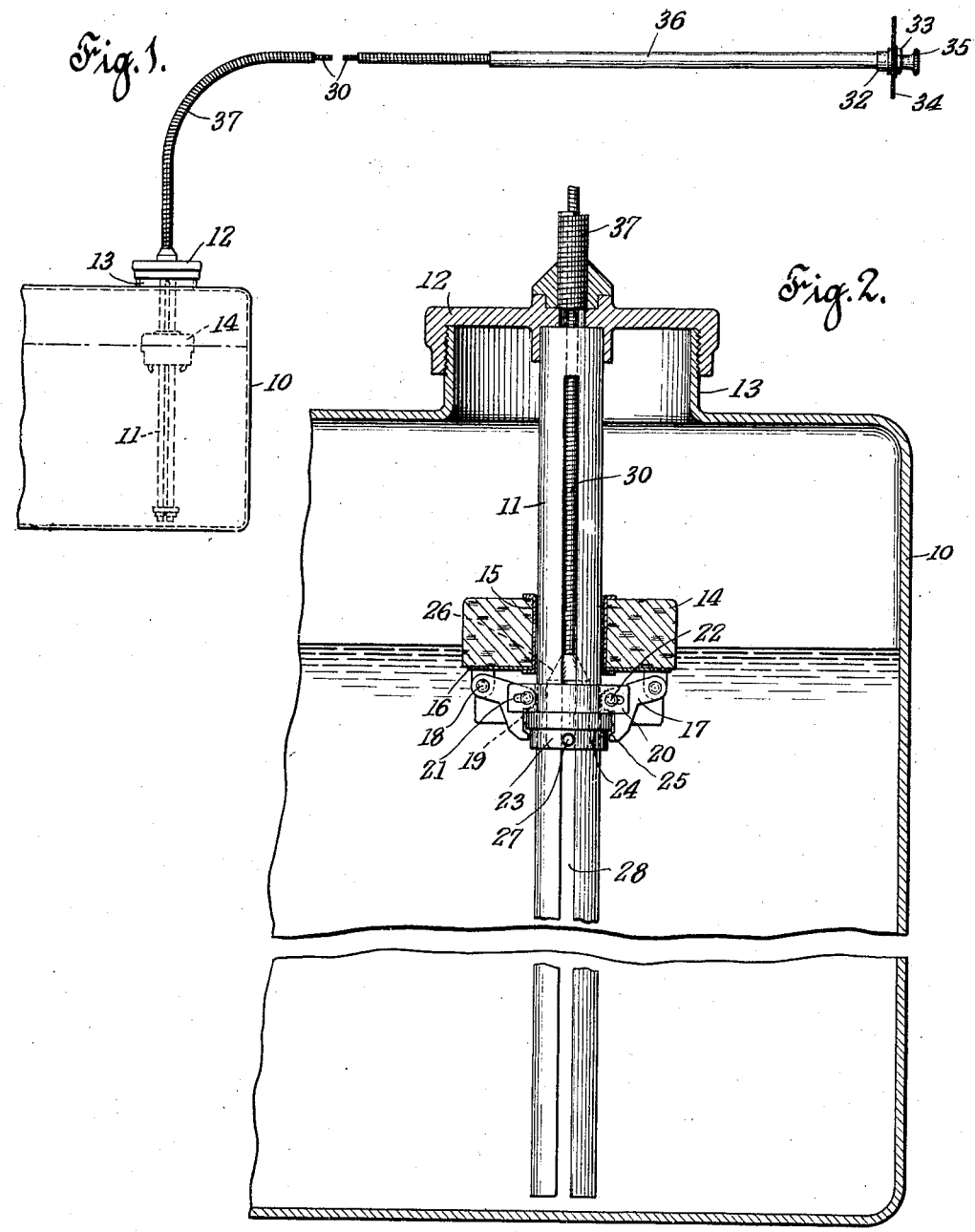

1,827,192

UNITED STATES PATENT OFFICE

CHARLES H. CUNO AND SIDNEY L. WOLFSON, OF MERIDEN, CONNECTICUT, ASSIGNORS TO THE CUNO ENGINEERING CORPORATION, OF MERIDEN, CONNECTICUT, A CORPORATION OF CONNECTICUT

LIQUID LEVEL GAUGE

Application filed October 1, 1927. Serial No. 223,414.

The main object of our invention is to provide a simple and reliable construction by means of which the depth of liquid in a tank can be readily determined.

Another object is to provide a gauge whose accuracy is substantially independent of ordinary changes in temperature and frictional fit of parts.

Another object is to provide a mechanism of the above character which can be readily installed in a motor vehicle for indicating to the driver the quantity of gasoline in the tank.

Another object is to provide a gauge which is rugged and reliable under all ordinary conditions of use.

Another object is to provide a gauge for automobile gas tanks with an unobtrusive indicator on the instrument board.

In carrying out the invention, we provide a float in the tank which rises and falls with the change of liquid level in the tank. This float is supported on a tubular guide and is provided with gripping mechanism normally disengaged from the guide.

This gripping mechanism consists of a number of jaws adapted to be turned into binding engagement with the guide by means of a collar on the guide and a flexible cable extending to the instrument board. The indicator portion of the gauge consists of a rod bearing a scale normally seated behind the instrument board, but provided with an operating knob at the front of the board where it is accessible to the driver. The indicator can be drawn out until the lower end of the cable raises the gripping jaws into binding engagement with the guide, which determines the maximum extent to which the indicator rod can be drawn out and shows the depth of the liquid in the tank. Pushing in of the indicator rod releases the gripping mechanism and leaves it free to descend with the float as the liquid level in the tank descends.

Fig. 1 is a diagrammatic side view of one form of mechanism embodying our invention.

Fig. 2 is a vertical sectional view of a fragment of a tank with the float in place and showing the gripping mechanism in action.

Fig. 3 is a vertical sectional view of the float and gripping mechanism disengaged.

Fig. 4 is a bottom plan view of the gripping mechanism.

Fig. 5 is a sectional view of the lower end of the guide.

Fig. 6 is an enlarged detail view of the indicator member of the gauge.

Fig. 7 is a transverse sectional view of the indicator rod.

The tank 10 may be of any suitable construction, either open or closed. A tubular guide 11 is suitably supported in the tank, preferably from a cap 12 which is adapted to be screwed on to a neck 13.

The float 14 may be of any suitable material and may be provided with a tubular central member 15 adapted to slide on the guide 11.

The gripping mechanism preferably has a base plate 16 suitably secured to the float 14 and carries a number of gripping jaws 17, preferably disposed opposite each other and pivoted at 18 to projecting lugs on the base plate 16 near an outer edge of the float. The inner ends of these jaws 17 are provided with suitable gripping teeth or fingers 19 adapted to be forcibly pressed against the guide 11 in a toggle-like action as shown in Fig. 2. A cross piece 20 is mounted on the guide 11 and connects the gripping jaws, for instance, by means of slots 21 in the opposite sides into which the pins 22 of the jaws project so that as the cross piece is raised from the position of Fig. 3 to that of Fig. 2, the jaws will be moved from the open position to the closed position.

For operating the gripping mechanism we provide a collar or slide 23 which slides up and down on the tubular guide 11 and is adapted to engage the cross piece 20 as shown in Fig. 2. This collar is also provided with a shoulder 24 for engaging the shoulders 25 of the gripping jaws for disengaging the jaws when the collar 23 is moved downwardly from the position of Fig. 2.

Inside of the guide 11 is an anchor plunger member 26 which is secured to the collar 23 by a pin 27 which extends thru slots 28 in the guide. The lower end of the guide may be cut away at 29 to prevent the jaws getting wedged at the bottom of the tank.

The collar 23 is operated by a flexible cable or rod 30, the lower end of which is secured to the plunger 26, and the outer end of which is secured to the rod 31. The rod 31 is guided in the sleeve 32 which has a nut 33 for securing it in the instrument board 34. The rod is preferably provided with a knob or handle 35 by which it may be readily drawn out or pushed in. The rod 31 is preferably flattened at least on one side and provided with a scale of suitable units such as liters, gallons or units of depth such as centimeters or inches or fractions for indicating whether the tank is ⅛, ½ or nearly full or empty.

The tube 36 serves as an extension of the sleeve 32 for guiding the rear end of the rod 31. The cable 30 is also preferably housed in a flexible conduit 37, one end of which is secured to the tube 36, and the other end of which is secured to the cap 12.

The float 14 rises and falls automatically with the changes in the level of the liquid in the tank. When it is desired to ascertain the level or quantity of the liquid the indicator rod 31 is pulled out until the collar 23 raises the crosspiece 20 and thus forces the jaws 17 into gripping engagement with the guide, which prevents further drawing out of the rod 31. The scale of the indicator rod 31 then shows the relative position of the float in the tank. When this has been determined, the rod 31 is pushed back out of the way by means of the knob 35. The weight of the cable 30 and the plunger 26 and collar 23 tends to assist the return movement of the indicator to the normal non-indicating position.

It should be understood that other changes in construction and arrangement may be made without departing from the spirit or scope of our invention.

We claim:

1. A liquid level gauge comprising a float, a guide therefor, gripping jaws suspended from said float, a cross piece having a pin and slot connection with said jaws a slide on said guide below said float, and means for raising said slide to engage said cross piece and tilt said jaws into engagement with said guide.

2. A liquid level gauge comprising a guide, a float slidable on said guide, jaws hinged to said float and adapted to engage said guide, an indicator, a cable connected at one end to said indicator a member cooperating with said guide and connected to the other end of said cable, means operated by said member and carried by said float for drawing said jaws into engagement with said guide when said member engages said means.

3. A liquid level gauge comprising an indicator, a tubular guide adapted to be supported in a tank, a float on said guide, jaws pivotally supported on said float and adapted to grip said guide, a collar slidable on said guide for operating said jaws, and a flexible cable extending from said indicator into said guide for operating said collar.

4. A liquid level gauge comprising, a guide, a float movable along said guide, a slide movable along the guide below said float, a member for operating said slide, and means carried by said float and responsive to engagement by said slide for engaging the guide to prevent movement of the float along said guide, said means comprising a jaw pivotally supported beneath said float and being shaped to be engaged by said slide between its pivot and guide engaging end portion.

5. A liquid level gauge comprising, a guide, a float movable along said guide, a slide movable along the guide below said float, a member for operating said slide, and mechanism carried by said float and responsive to engagement by said slide for engaging the guide to prevent movement of the float along said guide, said mechanism being provided with means to release the float from said guide in response to disengagement of the slide from said mechanism, and the guide engaging portion of said mechanism being positively disengaged by said slide on movement thereof from said mechanism.

6. A liquid level gauge comprising a guide, a float mounted to slide on the guide, oppositely disposed jaws pivoted to said float and having gripping shoulders movable adjacent said guide, a slide movable on said guide and means for moving said slide to engage said shoulders and for drawing said shoulders into gripping engagement with said guide in response to movement of said slide.

7. A liquid level gauge comprising a guide, a float mounted to slide on the guide, oppositely disposed jaws pivoted to said float and having gripping shoulders, a slide movable on said guide, and means for drawing said shoulders into gripping engagement with said guide by movement of said slide in one direction, said jaws having shoulders adapted to be engaged by said slide when moved in the reverse direction for releasing said jaws.

8. A liquid level gauge comprising a float mechanism, a guide means along which said float mechanism is movable with changes in liquid level, a slide movable up and down in the path of movement of the float mechanism but independently of said movement, means for guiding the movement of said slide, a manually operable indicator, means connecting said indicator and slide for moving said slide up and down with movement of the indicator, means responsive to an engagement between said slide and float mechanism for limiting the upward movement of both the slide and float mechanism, said limiting means including means for gripping the float guide means, and said gripping means being forcibly released by engagement between said slide and float mechanism with downward movement of said slide.

9. A liquid level gauge comprising a float mechanism, a guide means along which said float mechanism is movable with changes in liquid level, a slide movable up and down in the path of movement of the float mechanism but independently of said movement, means for guiding the movement of said slide, a manually operable indicator, means connecting said indicator and slide for moving said slide up and down with movement of the indicator, means responsive to an engagement between said slide and float mechanism for limiting the upward movement of both the slide and float mechanism, said limiting means including a plurality of separately movable devices to obtain a symmetrical and balanced gripping of said float guide means.

CHARLES H. CUNO.
SIDNEY L. WOLFSON.